United States Patent
Hayakawa et al.

(10) Patent No.: US 9,142,816 B2
(45) Date of Patent: Sep. 22, 2015

(54) ALKALINE BATTERY SEPARATOR AND ALKALINE BATTERY USING SEPARATOR

(75) Inventors: Tomohiro Hayakawa, Okayama (JP); Koichi Kambe, Osaka (JP); Hiroyuki Kawai, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 40 days.

(21) Appl. No.: 13/823,128

(22) PCT Filed: Sep. 6, 2011

(86) PCT No.: PCT/JP2011/070264
§ 371 (c)(1),
(2), (4) Date: Mar. 14, 2013

(87) PCT Pub. No.: WO2012/036025
PCT Pub. Date: Mar. 22, 2012

(65) Prior Publication Data
US 2013/0183569 A1 Jul. 18, 2013

(30) Foreign Application Priority Data

Sep. 16, 2010 (JP) ................................. 2010-207654

(51) Int. Cl.
*H01M 2/14* (2006.01)
*H01M 2/16* (2006.01)
*H01M 10/24* (2006.01)

(52) U.S. Cl.
CPC .......... *H01M 2/1626* (2013.01); *H01M 2/1686* (2013.01); *H01M 2/1613* (2013.01); *H01M 2/1633* (2013.01); *H01M 10/24* (2013.01)

(58) Field of Classification Search
CPC ... H01M 2/00; H01M 10/00; H01M 2002/00; H01M 2010/00
USPC ......... 429/129, 135, 141, 144, 145, 216, 235, 429/246, 255
See application file for complete search history.

(56) References Cited

U.S. PATENT DOCUMENTS

| | | |
|---|---|---|
| 3,351,495 A | 11/1967 | Larsen et al. |
| 6,379,836 B1 | 4/2002 | Kubo et al. |
| 8,097,366 B2 | 1/2012 | Harada et al. |
| 2008/0274409 A1* | 11/2008 | Harada et al. ................ 429/247 |
| 2009/0017385 A1 | 1/2009 | Harada et al. |
| 2010/0310921 A1 | 12/2010 | Hayakawa et al. |

FOREIGN PATENT DOCUMENTS

| | | |
|---|---|---|
| CN | 1177843 A | 4/1998 |
| CN | 1969406 A | 5/2007 |
| CN | 101128948 A | 2/2008 |
| EP | 1 770 803 A1 | 4/2007 |
| GB | 2 317 264 A | 3/1998 |
| JP | 2 119049 | 5/1990 |
| JP | 06-157091 A | 6/1994 |
| JP | 6 231746 | 8/1994 |
| JP | 09-274902 A | 10/1997 |
| JP | 10 92411 | 4/1998 |
| JP | 2005-116514 A | 4/2005 |
| JP | 2006-236808 A | 9/2006 |
| JP | 2007 227067 | 9/2007 |
| JP | 2008 234898 | 10/2008 |
| JP | 2008 235047 | 10/2008 |
| WO | 2008 075457 | 6/2008 |

OTHER PUBLICATIONS

International Preliminary Report on Patentability Issued Apr. 9, 2013 in PCT/JP11/070264 Filed Sep. 16, 2010.
International Search Report Issued Dec. 6, 2011 in PCT/JP11/70264 Filed Sep. 6, 2011.
Extended European Search Report issued Feb. 21, 2014, in Patent Application No. 11825031.5.
Communication pursuant to Article 94(3) EPC issued Dec. 5, 2014 in Patent Application No. 11 825 031.5.
Office Action dated Sep. 19, 2014, issued in corresponding Chinese patent application No. 201180044465.1.
Notification of Reasons for Rejection dated Feb. 10, 2015 issued in corresponding Japanese patent application No. 2012-533954.
Office Action dated Apr. 7, 2015 issued in corresponding Chinese patent application No. 201180044465 1.

* cited by examiner

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

Provided are an alkaline battery separator and an alkaline battery including the separator. The separator includes at least a coarse layer and a dense layer denser than the coarse layer. The coarse layer contains an alkaline-resistant cellulose fiber having a freeness value of 350 to 650 ml as a whole in the proportion of 25 to 65% by weight. The alkaline-resistant cellulose fiber includes at least two kinds of alkaline-resistant cellulose fibers having different freeness with each other. The difference in freeness value between the alkaline-resistant cellulose fibers having the highest and lowest freeness values is 300 to 700 ml. The dense layer contains an alkaline-resistant cellulose fiber which as a whole has a freeness value of 0 to 400 ml. The separator has a maximum pore size of 65 μm or smaller, and a liquid absorption capacity of 5 g/g or higher.

9 Claims, No Drawings

ALKALINE BATTERY SEPARATOR AND ALKALINE BATTERY USING SEPARATOR

CROSS REFERENCE TO THE RELATED APPLICATIONS

This application is a 35 U.S.C. §371 national stage patent application of International patent application PCT/JP2011/70264, filed on Sep. 6, 2011, the entire disclosure of which is herein incorporated by reference as a part of this application and claims priority to Japanese application No. 2010-207654, filed on Sep. 16, 2010, the entire disclosure of which is herein incorporated by reference as a part of this application.

FIELD OF THE INVENTION

The present invention relates to an alkaline battery separator, which is suitable for an alkaline battery that uses an alkaline electrolyte solution. The present invention also relates to an alkaline battery which includes such a separator.

BACKGROUND ART

In an alkaline battery, negatively charged anions migrate from a cathode across an alkaline electrolyte solution to an anode, while positively charged cations migrate from the anode across the alkaline electrolyte solution to the cathode. A separator is interposed between the cathode and the anode to separate these electrodes and prevent short-circuiting.

Such an alkaline battery separator needs to meet various requirements. For instance, such a separator should: (1) prevent internal short-circuiting between the cathode and the anode; (2) have satisfactory electrolyte absorption capacity to cause sufficient electrogenic reactions, while having good ion conduction as well as low electric resistance; (3) occupies a small space when incorporated into a battery so as to increase the amount of cathode and anode active materials (and therefore increasing the battery life); and (4) withstand, after incorporated into a battery, buckling caused by impacts due to vibrations or accidental drops during transport or handling, which may lead to internal short-circuiting of the battery.

For example, Patent Document 1 listed below (JP Laid-open Patent Publication No. 10-092411) discloses a separator paper for electrically isolating an anode active material and a cathode active material of an alkaline-battery, wherein said separator paper comprises a dense layer for keeping its denseness to prevent electrical internal shortage of said two active materials, and a liquid impregnating layer for increasing the liquid impregnate ratio of the electrolyte within the battery, with said dense layer and said liquid impregnate layer being integrally laminated.

Such a separator paper requires cellulose fiber(s) for the liquid impregnate layer having a freeness (CSF: Canadian standard freeness) value of no less than 700 ml, in order to prevent significant loss of liquid impregnate ratio of the separator paper.

PATENT DOCUMENT

[Patent Document 1] JP Laid-open Patent Publication No. 10-092411

DISCLOSURE OF THE INVENTION

Problems to be Solved by the Invention

The Patent Document 1, however, denies that beating or refining of alkaline-proof cellulose fibers for the liquid impregnate layer, as the beating or refining may jeopardize satisfactory liquid impregnate property of the liquid impregnate layer. Such unbeaten or unrefined fibers in the liquid impregnate layer of the separator paper may lead to the formation of large-size pores. Since the separator paper having such large-size pores has a reduced effective thickness of the dense layer which serves as a barrier layer, it is difficult to avoid dendrites which grow in the shape of needles and penetrates the separator paper, unless the dense layer is highly densified. However, such highly densification would result in unsatisfactory liquid impregnate property, and the resulting separator would increase the internal resistance of the battery. As such, it is difficult to achieve both satisfactory liquid impregnate property and good anti-short circuit capability at the same time.

An object of the present invention is to provide an alkaline battery separator, which can achieve satisfactory electrolyte retention and also has good anti-short circuit capability.

Another object of the present invention is to provide an alkaline battery separator, which has good impact resistance in addition to the above mentioned properties.

Yet another object of the present invention is to provide an alkaline battery separator, which has liquid (electrolyte) absorption capacity that is greater than conventional separators while at the same time being able to effectively prevent short-circuiting due to dendrites.

Means for Solving the Problems

As a result of intensive studies conducted by the inventors of the present invention to achieve the above objects, it has been found that if (i) a separator is formed in the form of a laminate structure of at least a coarse layer and a dense layer; and (ii) further the coarse layer contains a certain ratio of alkaline-resistant cellulose fibers, in which the alkaline-resistant cellulose fibers comprise a mixture of different alkaline-resistant cellulose fibers having a certain difference in CSF among them so as to have a certain CSF value as a whole, then (iii) the separator can achieve satisfactory electrolyte retention because of the cellulose fibers having higher CSF value, and can achieve reduction in a maximum pore size because of the cellulose fibers having lower CSF value. As a result, (iv) such a separator can achieve the level of electrolyte retention required for use in an alkaline battery while at the same time effectively suppressing the formation of dendrites. Furthermore, (v) the impact resistance of the separator can be improved.

Therefore, one aspect of the present invention concerns an alkaline battery separator including at least a coarse layer (A) and a dense layer (B) denser than the coarse layer, the coarse layer (A) including an alkaline-resistant synthetic fiber (A), an alkaline-resistant binder fiber (A) and an alkaline-resistant cellulose fiber (A); and the dense layer (B) including an alkaline-resistant synthetic fiber (B), an alkaline-resistant binder fiber (B) and an alkaline-resistant cellulose fiber (B). The coarse layer (A) contains the alkaline-resistant cellulose fiber (A) in the proportion of 25 to 65% by weight based on the coarse layer. The alkaline-resistant cellulose fiber (A) has a freeness value of 350 to 650 ml as a whole, and includes at least two kinds of alkaline-resistant cellulose fibers having different freeness with each other, in which the difference in freeness value between the alkaline-resistant cellulose fibers having the highest and lowest freeness values is 300 to 700 ml. The alkaline-resistant cellulose fiber (B), as a whole, has a freeness value of 0 to 400 ml. The separator has a maximum pore size of 65 μm or smaller, and a liquid absorption capacity of 5 g/g or higher.

For example, in the coarse layer (A), the proportion of the cellulose fiber having the lowest freeness value may be about 15 to 55% by weight based on the whole alkaline-resistant cellulose fiber (A).

In the coarse layer (A), the dense layer (B) or both, the alkaline-resistant cellulose fiber(s) may include, for example, at least one member selected from a group consisting of a mercerized pulp and an organic solvent-spun cellulose fiber. The mercerized pulp may include at least one member selected from a group consisting of a mercerized hardwood pulp, a mercerized softwood pulp, a mercerized eucalyptus pulp, a mercerized esparto pulp, a mercerized pineapple pulp, a mercerized abaca pulp, a mercerized sisal pulp, and a mercerized cotton linter pulp.

In the coarse layer (A), the dense layer (B) or both, the alkaline-resistant synthetic fiber preferably includes a polyvinyl alcohol fiber. In the coarse layer (A), the dense layer (B) or both, the alkaline-resistant binder fiber preferably includes at least one member selected from a group consisting of a polyvinyl alcohol binder fiber and an ethylene-vinyl alcohol copolymer binder fiber.

In the coarse layer (A), the dense layer (B) or both, the alkaline-resistant synthetic fiber preferably has a single fiber fineness of 0.05 to 1 dtex.

Another aspect of the present invention concerns an alkaline battery separator including at least a coarse layer (A) and a dense layer (B), each of the coarse layer (A) and the dense layer (B) including an alkaline-resistant synthetic fiber, an alkaline-resistant binder fiber and an alkaline-resistant cellulose fiber. The separator has a maximum pore size of 65 μm or smaller. The separator has an air permeability of 13 cc/cm$^2$/sec or higher and a ring crush strength of 200 g or stronger.

Furthermore, the present invention encompasses an alkaline battery which includes a separator having any one of the aforementioned configurations.

The present invention encompasses any combination of at least two features disclosed in the claims and/or the specification. In particular, the present invention encompasses any combination of at least two claims.

Effect of the Invention

According to the present invention, since an alkaline battery separator has a sufficient liquid absorption capacity to retain an adequate amount of electrolyte while at the same time having a reduced maximum pore size in the separator, such a separator allows for satisfactory discharge performance of a battery while at the same time preventing short-circuiting due to the formation of dendrites.

Such a separator has a certain ratio of an alkaline-resistant cellulose fiber in a coarse layer (A) so as to allow the separator to have satisfactory impact resistance.

The present invention also provides an alkaline battery separator, which has a reduced maximum pore size, thus being capable of preventing short-circuiting due to dendrites. Such a separator is not only able to effectively prevent short-circuiting but also has liquid (electrolyte) absorption capacity that is greater than conventional separators.

DESCRIPTION OF THE EMBODIMENTS (Alkaline Battery Separator)

An alkaline battery separator according to the present invention includes at least a certain coarse layer (A) and a certain dense layer (B) denser than the coarse layer, and has a maximum pore size of 65 μm or smaller and liquid absorption capacity of no less than 5.0 g/g or higher. An alkaline battery separator according to the present invention, because of the combination of such coarse and dense layers, can achieve satisfactory electrolyte retention, can prevent short-circuiting due to the formation of dendrites, and has improved impact resistance.

(1) Coarse Layer (A)

A coarse layer (A) includes: an alkaline-resistant synthetic fiber (A), an alkaline-resistant binder fiber (A) and an alkaline-resistant cellulose fiber (A).

(1-1) Alkaline-Resistant Synthetic Fiber (A)

Examples of an alkaline-resistant synthetic fiber include a polyvinyl alcohol fiber, an ethylene-vinyl alcohol copolymer fiber, a polyolefin fiber (e.g. a polypropylene fiber, a polyethylene fiber, a polypropylene-polyethylene conjugate fiber), a polyamide fiber, and a polyamide-modified polyamide conjugate fiber. These alkaline-resistant synthetic fibers may be used alone or as a combination of at least two. These fibers may be hydrophilically treated if necessary. Among them, a polyvinyl alcohol fiber is preferred in terms of electrolyte absorption capacity.

A polyvinyl alcohol fiber preferably has a dissolving temperature in water of 90° C. or higher (for example, within the range of about 90 to about 200° C.), more preferably 100° C. or higher (for example, within the range of about 100° C. to about 150° C.). Such polyvinyl alcohol fibers are available, for example, as vinylon subject (matrix) fibers from Kuraray Co., Ltd. If necessary, a polyvinyl alcohol fiber may be modified by acetalization or others. It should be noted that the polyvinyl alcohol fiber may be constituted by a vinyl alcohol polymer alone, or a polyvinyl alcohol fiber may be a conjugate spun fiber or a blend spun fiber (e.g. an islands-in-a-sea fiber) which also contains polymer(s) other than a vinyl alcohol polymer.

In order to achieve satisfactory electrolyte retention and small pore size, the alkaline-resistant synthetic fiber may have a single fiber fineness of, for example, about 0.05 to about 1 dtex, preferably about 0.1 to about 0.8 dtex, more preferably about 0.15 to about 0.6 dtex. In order to produce a uniform paper, the alkaline-resistant synthetic fiber may have a fiber length of, for example, about 0.3 to about 10 mm, preferably about 0.5 to about 5 mm, more preferably about 1 to about 4 mm.

(1-2) Alkaline-Resistant Binder Fiber (A)

An alkaline-resistant binder fiber is used to improve bondability (or mixed paper formability) between alkaline-resistant synthetic fibers and alkaline-resistant cellulose fibers in a mixed paper making process. Examples of the alkaline-resistant binder fiber include a polyvinyl alcohol binder fiber and an ethylene-vinyl alcohol copolymer binder fiber. These binder fibers may be used alone or as a combination of at least two.

In order to achieve good adhesion while at the same time reducing a pore size of a separator, the alkaline-resistant binder fiber may have a single fiber fineness of, for example, about 0.5 to about 3 dtex, preferably about 0.7 to about 2 dtex. In order to produce a uniform paper, the alkaline-resistant binder fiber may have a fiber length of, for example, about 0.3 to about 10 mm, preferably about 0.5 to about 5 mm, more preferably about 1 to about 4 mm.

A polyvinyl alcohol binder fiber preferably has a dissolving temperature in water of 85° C. or lower (for example, within the range of about 30 to about 85° C.), particularly 80° C. or lower (for example, within the range of about 40 to about 80° C.). Such polyvinyl alcohol binder fibers are available, for example, as vinylon binder fibers from Kuraray Co., Ltd. The polyvinyl alcohol binder fiber may be constituted by a vinyl alcohol polymer alone. Alternatively, a polyvinyl alcohol binder fiber may also contain polymer(s) other than a vinyl alcohol polymer.

(1-3) Alkaline-Resistant Cellulose Fiber (A)

The alkaline-resistant cellulose fiber includes at least two kinds of alkaline-resistant cellulose fibers having different freeness with each other. The alkaline-resistant cellulose fiber, as a whole, has a freeness (CSF: Canadian standard freeness) value of 350 to 650 ml (preferably, about 400 to about 600 ml).

Examples of the alkaline-resistant cellulose fibers include a regenerated cellulose fiber, a mercerized pulp and an organic solvent-spun cellulose fiber. These fibers may be used alone or as a combination of at least two.

Examples of regenerated cellulose fibers include a viscose rayon, a polynosic rayon, a high tenacity rayon, and a cuprammonium rayon.

The mercerized pulp may be produced by mercerization of various pulp species. Examples of such pulp species include a hardwood pulp, a softwood pulp, an eucalyptus pulp, an esparto pulp, a pineapple pulp, an abaca pulp, a sisal pulp, and a cotton linter pulp. These pulps may be used alone or as a combination of at least two.

An organic solvent-spun cellulose fiber refers to a certain type of regenerated fiber, which uses wood pulp(s) as a raw material and is spun from a dope or a spinning solution containing organic solvent(s) (e.g. amine oxides) in which cellulose in the pulp(s) is directly dissolved. An organic solvent-spun cellulose fiber differs from a regenerated cellulose fiber in that the former is produced by direct dissolution of pulp cellulose while the latter is produced by using cellulose derivative(s) derived from pulp cellulose.

An organic solvent-spun cellulose fiber may, for example, be produced by dry-wet spinning a dope containing amine oxide(s) and cellulose dissolved in the amine oxide(s) to obtain as-spun yarns from precipitated cellulose, followed by drawing of the yarns. A representative example of such a fiber is lyocell which is commercially available from Lenzing under the trade name of Tencel®.

The alkaline-resistant cellulose fibers include a plurality kinds (e.g. two to four kinds, preferably two to three kinds, more preferably two kinds) of alkaline-resistant cellulose fibers with different degrees of beating (or refining). The plurality of alkaline-resistant cellulose fibers include a cellulose fiber having the highest freeness value (which may be hereinafter referred to as "a lower-beating-degree cellulose fiber") and a cellulose fiber having the lowest freeness value (which may be hereinafter referred to as "a higher-beating-degree cellulose fiber"). The difference in CSF value between the cellulose fiber having the highest freeness value and the cellulose fiber having the lowest freeness value is 300 to 700 ml, preferably 330 to 680 ml, more preferably 350 to 650 ml.

An alkaline-resistant cellulose fiber may have a desired CSF value, through appropriate adjustment of the degree of beating or refining. A plurality of alkaline-resistant cellulose fibers having desired respective CSF values may be mixed such that the alkaline-resistant cellulose fiber, as a whole, has a freeness (CSF) value of 350 to 650 ml (preferably, within the range of about 400 to about 600 ml).

Any alkaline-resistant cellulose fiber may be beaten or refined to produce a lower-beating-degree cellulose fiber or a higher-beating-degree cellulose fiber. The lower-beating degree cellulose fiber may be preferably a regenerated cellulose fiber or a mercerized pulp which is unbeaten or lightly beaten. Among these, a mercerized pulp is particularly preferred. The higher-beating-degree cellulose fiber may be preferably an organic solvent-spun fiber with a relatively high degree of beating.

A lower-beating-degree cellulose fiber may have a CSF value of, for example, 500 ml or higher, preferably 550 ml or higher, more preferably 600 ml or higher. The upper limit for the CSF value of a lower-beating-degree cellulose fiber can be set by the CSF value of an unbeaten cellulose fiber, and may be, for example, 750 ml or lower.

The proportion of a lower-beating-degree cellulose fiber in the alkaline-resistant cellulose fiber may be appropriately adjusted, for example, according to the CSF values of the lower-beating-degree and higher-beating-degree cellulose fibers used, and may be, for example, in the order of 15 to 55% by weight, preferably 18 to 53% by weight, more preferably 20 to 50% by weight based on the whole alkaline-resistant cellulose fiber.

In order to enhance impact resistance, the proportion of the alkaline-resistant cellulose fiber is preferably about 30 to 60% by weight, more preferably about 35 to 55% by weight based on the whole the coarse layer.

(2) Dense Layer (B)

A dense layer (B) includes: an alkaline-resistant synthetic fiber (B), an alkaline-resistant binder fiber (B) and an alkaline-resistant cellulose fiber (B). In contrast to the coarse layer (A), the alkaline-resistant cellulose fiber (B), as a whole, has a freeness value of 0 to 400 ml, preferably 50 to 380 ml, more preferably 100 to 350 ml, even more preferably 150 to 345 ml.

The difference in CSF value between the alkaline-resistant cellulose fiber (A) in the coarse layer (A) and the alkaline-resistant cellulose fiber (B) in the dense layer (B) may be 100 to 450 ml, preferably 130 to 400 ml, more preferably 150 to 380 ml.

The foregoing description with respect to the alkaline-resistant synthetic fiber (A) and the alkaline-resistant binder fiber (A) in the coarse layer (A) may also be applied to the alkaline-resistant synthetic fiber (B) and the alkaline-resistant binder fiber (B) in the dense layer (B).

Furthermore, just as in the foregoing description with respect to the alkaline-resistant cellulose fiber (A) in the coarse layer (A), examples of the alkaline-resistant cellulose fiber (B) include a regenerated cellulose fiber, a mercerized pulp and an organic solvent-spun cellulose fiber, and these fibers may be used alone or as a combination of at least two. Among these, organic solvent-spun cellulose fibers are preferred because they may be beaten or refined to produce a fibrillized product containing ultrafine fibers. More preferably, the alkaline-resistant cellulose fiber (B) is constituted by organic solvent-spun cellulose fiber(s) alone.

(3) Process of Making an Alkaline Battery Separator

An alkaline battery separator according to the present invention can be made by a papermaking technique known or common in the art. One embodiment of such a process may, for example, include: preparing a coarse layer slurry that includes an alkaline-resistant synthetic fiber (A), an alkaline-resistant binder fiber (A) and an alkaline-resistant cellulose fiber (A), with the fibers being dispersed in water; preparing a dense layer slurry that includes an alkaline-resistant synthetic fiber (B), an alkaline-resistant binder fiber (B) and an alkaline-resistant cellulose fiber (B), with the fibers being dispersed in water; and depositing a coarse layer (A) prepared from the coarse layer slurry and a dense layer (B) prepared from the dense layer slurry to form an integral sheet structure.

The coarse layer (A) and the dense layer (B) may be integrally deposited with a multi-layer paper making machine.

Alternatively, each of the coarse layer and the dense layer may be separately formed with a paper making machine, and subsequently brought together to form an integral sheet structure. The separator may comprise more than one of such coarse layer (A) and/or more than one of such dense layer (B). For example, a two-layer structure of coarse layer/dense layer, a three-layer structure of coarse layer/dense layer/coarse layer, and a three-layer structure of dense layer/coarse layer/dense layer may be provided.

Examples of screens used for papermaking machines include a cylinder screen, a short screen, and a continuous screen. When muti-layer sheet is formed, these screens can be used alone or as a combination of at least two. As long as the resulting separator has a maximum pore size of 65 µm or smaller, any papermaking machine(s) may be appropriately selected according to the respective properties of the coarse layer slurry and the dense layer slurry. Preferably, a double cylinder papermaking machine is used to form a multi-layer structure that includes a coarse layer and a dense layer.

If necessary, depositing a coarse layer (A) and a dense layer (B) may include drying by, for example, a Yankee dryer and/or may include heat pressing. The resulting separator paper may be hydrophilically treated with a surfactant, in order to improve liquid (electrolyte) absorption capacity.

(4) Characteristics of an Alkaline Battery Separator (4-1) Pore Size

An alkaline battery separator according to the present invention has a maximum pore size of 65 µm or smaller, preferably 63 µm or smaller, more preferably 61 µm or smaller. A lower value for the maximum pore size implies greater density in the separator so as to effectively prevent penetration by dendrites. Nevertheless, such a maximum pore size is generally 30 µm or greater.

The separator may have an average pore size of, for example, about 5 to about 30 µm, preferably about 10 to about 25 µm.

The coarse layer may have a maximum pore size of, for example, 200 µm or smaller (for example, 80 to 200 µm), preferably 195 µm or smaller. Although the coarse layer includes a lower-beating-degree cellulose fiber that contributes to a relatively large pore size, the coarse layer is combined with a dense layer so as to reduce a maximum pore size of a separator as a whole.

Maximum pore size and average pore size used herein are values that can be measured by the procedures described in the Examples section.

(4-2) Liquid (Electrolyte) Absorption Capacity

In order to achieve satisfactory liquid (electrolyte) retention, the separator should have a liquid (electrolyte) absorption capacity of 5 g/g or higher, preferably 5.5 g/g or higher, more preferably 6 g/g or higher. Although there is no specific upper limit, the liquid (electrolyte) absorption capacity of a separator is generally 20 g/g or lower. Liquid (electrolyte) absorption capacity used herein refers to a value that can be measured by the procedures described in the Examples.

(4-3) Air Permeability

A separator according to the present invention can still achieve good anti-short circuit capability and relatively high air permeability because of a relatively small maximum pore size as mentioned above. The separator may have an air permeability of, for example, about 5 to 40 cc/cm$^2$/sec, preferably about 8 to 35 cc/cm$^2$/sec, more preferably about 11 to 30 cc/cm$^2$/sec. In particular, the air permeability may be 13 cc/cm$^2$/sec or higher (for example, within the range of about 13 to about 40 cc/cm$^2$/sec). Such air permeability can not only reduce the internal resistance of a battery, but can also improve, for example, the permeability of oxygen gas in an alkaline battery. Air permeability used herein refers to a value that can be measured by the procedures described in the Examples.

(4-4) Ring Crush Strength

In order to achieve sufficient resistance against impacts such as accidental drops, a separator may have a ring crush strength of, preferably, 200 g or higher, more preferably 210 g or higher. Although there is no specific upper limit as far as improvement in impact resistance is concerned, the ring crush strength is generally 400 g or lower. Ring crush strength used herein indicates so-called "stiffness" of a battery separator and refers to a value that can be measured by the procedures that will be discussed later.

(4-5) Tensile Strength and Tensile Elongation

A separator according to the present invention may have any tensile strength and any tensile elongation in accordance with the material(s) used in and/or by the thickness of the separator, as long as the tensile strength and tensile strength of the separator do not hinder the manufacturing of an alkaline battery. The separator may have a tensile strength of, for example, 1.5 kg/15 mm or higher (for example, 1.8 to 5 kg/15 mm), preferably 2.0 kg/15 mm or higher (for example, 1.8 to 4 kg/15 mm). The separator may have a tensile elongation of, for example, 5 to 15%, preferably 6 to 10%. Tensile strength and tensile elongation used herein refer to values that can be measured by the procedures described in the Examples.

(4-6) Basis Weight and Thickness

Although the separator may have a basis weight and a thickness that can be appropriately selected according to the type of a battery for which the separator may be used, in order to achieve a reduced thickness, the separator may have a basis weight of, for example, about 15 to 40 g/m$^2$, preferably about 20 to 35 g/m$^2$. A separator according to the present invention may have a thickness of, for example, about 0.05 to about 0.3 mm, preferably about 0.07 to about 0.1 mm.

A separator according to the present invention may have a ratio of the thickness of the dense layer relative to the thickness of the coarse layer (i.e. (dense layer thickness)/(coarse layer thickness)), which is, for example, 40/60 to 60/40, preferably 45/55 to 55/45, more preferably 51/49 to 55/45. Basis weight and thickness used herein refer to values that can be measured by the procedures described in the Examples.

(Alkaline Battery)

A separator according to the present invention can be suitably employed in an alkaline battery, and can improve the discharge performance of a battery comprising the separator while at the same time preventing short-circuiting, thus achieving a prolonged battery life.

An alkaline battery according to the present invention, which includes a separator having any one of the aforementioned configurations, can be made by any process or technique that is known or common in the art. Examples of the arrangement of the separator in an alkaline battery include a cross strip arrangement (i.e. a separator of a cross-shaped configuration with a base and a cylinder), a round strip arrangement (i.e. a separator having a rolled cylinder), and a spiral strip arrangement (i.e. a separator having a rolled spiral).

The separator according to the present invention can be suitably employed in a primary battery such as an alkaline manganese battery, a mercury battery, a silver oxide battery, and an air battery; as well as in a secondary battery such as a nickel-cadmium battery, a silver-zinc battery, a silver-cadmium battery, a nickel-zinc battery, and a nickel-hydrogen battery.

EXAMPLES

The present invention will be described in detail with reference to Examples. The present invention is not limited to these Examples. Various physical properties discussed in the Examples and Comparative Examples were measured by the following procedures.

[Freeness (CSF; mL)]

Canadian standard freeness was measured in accordance with "Pulps—Determination of drainability" of Japanese Industrial Standards P 8121.

[Thickness (mm) and Density (g/cm$^3$)]

Thickness and density were measured in accordance with "Paper and board—Determination of thickness and density" of Japanese Industrial Standards P 8118.

[Basis Weight (g/cm$^2$)]

Basis weight was measured in accordance with "Paper and board—Determination of grammage" of Japanese Industrial Standards P 8124.

[Tensile Strength and Tensile Elongation (kg/15 mm)]

Tensile strength and tensile elongation were measured in accordance with "Paper and board—Determination of tensile properties" of Japanese Industrial Standards P 8113.

[Liquid (Electrolyte) Absorption Capacity (g/g)]

A sample of 50 mm×50 mm was immersed in a 34% aqueous solution of KOH at a bath ratio of 1:100 for 30 minutes and was drained for 30 seconds without suction. Subsequently, the weight of the sample was measured. The weight of the liquid retained in the sample was divided by the weight of the pre-immersed sample to calculate liquid (electrolyte) absorption capacity.

[Ring Crush Strength (g)]

A separator sample (45 mm×50 mm) was rolled twice to form a double-rolled cylinder. The separator was inserted into a PP cylinder having an inner diameter φ of 8 mm and a length of 40 mm, in such a way that the transverse direction of the separator corresponds to the longitudinal direction of the cylinder. A 34% aqueous solution of KOH was added into the cylinder, such that the separator in the cylinder is wetted up to 45 mm above from the bottom. A handy Compression Tester (KES-G5) produced by KATO TECH CO., LTD. was used to drop a compression plate (2 cm$^2$) at a compression velocity of 1 mm/sec to determine a compression strength of 5 cm upper tip of the sample which is outside of the immersed area.

[Pore Size (μm)]

A Perm-Porometer produced by Porous Materials, Inc. was used to determine pore size distribution over a sheet by using a bubble point method to calculate an average pore size and a maximum pore size.

[Air Permeability (cc/cm$^2$/sec)]

Air permeability was measured by a Frazier type air permeability tester in accordance with "Testing method for woven fabrics—Determination of air permeability" of Japanese Industrial Standards L 1096 6.27.

Example 1

(1) Preparation of a Coarse Layer Slurry

A coarse layer slurry was prepared from 40% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), 30% by weight of lower-beating-degree mercerized LBKPs (Leaf Bleached Kraft Pulp) with a CSF value of 705 ml, and 15% by weight of higher-beating-degree solvent-spun cellulose fibers (highly beaten fibers of "Tencel"; 1.7 dtex×2 mm manufactured by Lenzing) with a CSF value of 150 ml, all dispersed in water. The alkaline-resistant cellulose fibers as a whole had a CSF value of 550 ml, with a beating degree difference in CSF value between lower-beating-degree cellulose fibers and higher-beating-degree cellulose fibers of 555 ml.

(2) Preparation of a Dense Layer Slurry

A dense layer slurry was prepared from 35% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), and, as alkaline-resistant cellulose fiber, 50% by weight of beaten fibers of solvent-spun cellulose fibers ("Tencel"; 1.7 dtex×2 mm manufactured by Lenzing) beaten to have a CSF value of 232 ml, all dispersed in water.

(3) Preparation of a Separator Paper

A double cylinder papermaking machine capable of making a two-layer paper was used to produce a paper web with two different layers that are made from the coarse layer slurry and the dense layer slurry, respectively. The resulting paper web was dried with a Yankee dryer to give an alkaline battery separator with a basis weight of 27 g/m$^2$ and a thickness of 86 μm. The characteristics of this separator are shown in Table 1.

Example 2

An alkaline battery separator was prepared in the same manner as that of Example 1, except that the alkaline-resistant cellulose fibers used in the coarse layer in Example 1 were replaced with 30% by weight of lower-beating-degree mercerized LBKPs with a CSF value of 705 ml and 15% by weight of higher-beating-degree solvent-spun cellulose fibers (highly beaten fibers of "Tencel"; 1.7 dtex×2 mm manufactured by Lenzing) with a CSF value of 288 ml, such that the alkaline-resistant cellulose fibers as a whole had a CSF value of 581 ml, with a beating degree difference in CSF value between lower-beating-degree cellulose fibers and higher-beating-degree cellulose fibers of 417 ml. The characteristics of this separator are shown in Table 1.

Example 3

An alkaline battery separator was prepared in the same manner as that of Example 1, except that the alkaline-resistant cellulose fibers used in the coarse layer in Example 1 were replaced with 30% by weight of lower-beating-degree mercerized LBKPs with a CSF value of 705 ml and 15% by weight of higher-beating-degree solvent-spun cellulose fibers (highly beaten fibers of "Tencel"; 1.7 dtex×2 mm manufactured by Lenzing) with a CSF value of 80 ml, such that the alkaline-resistant cellulose fibers as a whole had a CSF value of 416 ml, with a beating degree difference in CSF value between lower-beating-degree cellulose fibers and higher-beating-degree cellulose fibers of 625 ml. The characteristics of this separator are shown in Table 1.

Example 4

An alkaline battery separator was prepared in the same manner as that of Example 1, except that the alkaline-resistant cellulose fibers used in the coarse layer in Example 1 were replaced with 38% by weight of lower-beating-degree mercerized LBKPs with a CSF value of 705 ml and 7% by weight of higher-beating-degree solvent-spun cellulose fibers (highly beaten fibers of "Tencel"; 1.7 dtex×2 mm manufactured by Lenzing) with a CSF value of 150 ml, such that the alkaline-resistant cellulose fibers as a whole had a CSF value of 598 ml, with a beating degree difference in CSF value between lower-beating-degree cellulose fibers and higher-beating-degree cellulose fibers of 555 ml. The characteristics of this separator are shown in Table 1.

Example 5

An alkaline battery separator was prepared in the same manner as that of Example 1, except that the alkaline-resistant cellulose fibers used in the coarse layer in Example 1 were replaced with 18% by weight of lower-beating-degree mercerized LBKPs with a CSF value of 705 ml and 27% by weight of higher-beating-degree solvent-spun cellulose fibers (highly beaten fibers of "Tencel"; 1.7 dtex×2 mm manufactured by Lenzing) with a CSF value of 150 ml, such that the alkaline-resistant cellulose fibers as a whole had a CSF value of 418 ml, with a beating degree difference in CSF value between lower-beating-degree cellulose fibers and higher-beating-degree cellulose fibers of 555 ml. The characteristics of this separator are shown in Table 1.

Example 6

(1) Preparation of a Coarse Layer Slurry

A coarse layer slurry was prepared from 30% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), 37% by weight of lower-beating-degree mercerized LBKPs with a CSF value of 705 ml, and 18% by weight of higher-beating-degree solvent-spun cellulose fibers (highly beaten fibers of "Tencel"; 1.7 dtex×2 mm manufactured by Lenzing) with a CSF value of 150 ml, all dispersed in water. The alkaline-resistant cellulose fibers as a whole had a CSF value of 550 ml, with a beating degree difference in CSF value between lower-beating-degree cellulose fibers and higher-beating-degree cellulose fibers of 555 ml.

(2) An alkaline battery separator was prepared in the same manner as that of Example 1, except that the coarse layer slurry prepared in the above sub-section (1) was used instead. The characteristics of this separator are shown in Table 1.

Example 7

(1) Preparation of a Coarse Layer Slurry

A coarse layer slurry was prepared from 50% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), 23% by weight of lower-beating-degree mercerized LBKPs with a CSF value of 705 ml, and 12% by weight of higher-beating-degree solvent-spun cellulose fibers (highly beaten fibers of "Tencel"; 1.7 dtex×2 mm manufactured by Lenzing) with a CSF value of 150 ml, all dispersed in water. The alkaline-resistant cellulose fibers as a whole had a CSF value of 550 ml, with a beating degree difference in CSF value between lower-beating-degree cellulose fibers and higher-beating-degree cellulose fibers of 555 ml.

(2) An alkaline battery separator was prepared in the same manner as that of Example 1, except that the coarse layer slurry prepared in the above sub-section (1) was used instead. The characteristics of this separator are shown in Table 1.

Example 8

An alkaline battery separator was prepared in the same manner as that of Example 1, except that the dense layer contained 35% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), and, as alkaline-resistant cellulose fiber, 50% by weight of beaten fibers of solvent-spun cellulose fibers ("Tencel"; 1.7 dtex×2 mm manufactured by Lenzing) beaten to have a CSF value of 344 ml. The characteristics of this separator are shown in Table 1.

Example 9

An alkaline battery separator was prepared in the same manner as that of Example 1, except that the alkaline-resistant cellulose fibers used in the coarse layer in Example 1 were replaced with 30% by weight of lower-beating-degree mercerized LBKPs with a CSF value of 625 ml and 15% by weight of higher-beating-degree solvent-spun cellulose fibers (highly beaten fibers of "Tencel"; 1.7 dtex×2 mm manufactured by Lenzing) with a CSF value of 150 ml, such that the alkaline-resistant cellulose fibers as a whole had a CSF value of 411 ml, with a beating degree difference in CSF value between lower-beating-degree cellulose fibers and higher-beating-degree cellulose fibers of 450 ml. The characteristics of this separator are shown in Table 1.

Example 10

An alkaline battery separator was prepared in the same manner as that of Example 1, except that the dense layer contained 35% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), and, as alkaline-resistant cellulose fiber, 50% by weight of beaten fibers of solvent-spun cellulose fibers ("Tencel"; 1.7 dtex×2 mm manufactured by Lenzing) beaten to have a CSF value of 125 ml. The characteristics of this separator are shown in Table 1.

Comparative Example 1

(1) Preparation of a Coarse Layer Slurry

A coarse layer slurry was prepared from 40% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), and 45% by weight of mercerized LBKPs with a CSF value of 705 ml, all dispersed in water. The alkaline-resistant cellulose fiber had a CSF value of 705 ml, with a beating degree difference in CSF value between lower-beating-degree cellulose fibers and higher-beating-degree cellulose fibers of 0 ml because the alkaline-resistant cellulose fibers in this Comparative Example were constituted by a single cellulose fiber.

(2) An alkaline battery separator was prepared in the same manner as that of Example 1, except that the coarse layer slurry prepared in the above sub-section (1) was used instead. The characteristics of this separator are shown in Table 2.

Comparative Example 2

An alkaline battery separator was prepared in the same manner as that of Example 1, except that the alkaline-resistant cellulose fibers used in the coarse layer in Example 1 were replaced with 30% by weight of lower-beating-degree mercerized LBKPs with a CSF value of 705 ml and 15% by weight of higher-beating-degree solvent-spun cellulose fibers (highly beaten fibers of "Tencel"; 1.7 dtex×2 mm manufactured by Lenzing) with a CSF value of 450 ml, such that the alkaline-resistant cellulose fibers as a whole had a CSF value of 659 ml, with a beating degree difference in CSF value between lower-beating-degree cellulose fibers and higher-beating-degree cellulose fibers of 255 ml. The characteristics of this separator are shown in Table 2.

Comparative Example 3

An alkaline battery separator was prepared in the same manner as that of Example 1, except that the alkaline-resistant cellulose fibers used in the coarse layer in Example 1 were replaced with 30% by weight of lower-beating-degree mercerized LBKPs with a CSF value of 400 ml and 15% by weight of higher-beating-degree solvent-spun cellulose fibers (highly beaten fibers of "Tencel"; 1.7 dtex×2 mm manufactured by) with a CSF value of 150 ml, such that the alkaline-resistant cellulose fibers as a whole had a CSF value of 322 ml, with a beating degree difference in CSF value between lower-beating-degree cellulose fibers and higher-beating-degree cellulose fibers of 250 ml. The characteristics of this separator are shown in Table 2.

Comparative Example 4

An alkaline battery separator was prepared in the same manner as that of Example 1, except that the alkaline-resistant cellulose fibers used in the coarse layer in Example 1 were replaced with 13.5% by weight of lower-beating-degree mercerized LBKPs with a CSF value of 705 ml and 31.5% by weight of higher-beating-degree solvent-spun cellulose fibers (highly beaten fibers of "Tencel"; 1.7 dtex×2 mm manufactured by Lenzing) with a CSF value of 150 ml, such that the alkaline-resistant cellulose fibers as a whole had a CSF value of 305 ml, with a beating degree difference in CSF value between lower-beating-degree cellulose fibers and higher-beating-degree cellulose fibers of 555 ml. The characteristics of this separator are shown in Table 2.

Comparative Example 5

An alkaline battery separator was prepared in the same manner as that of Example 1, except that the alkaline-resistant cellulose fibers used in the coarse layer in Example 1 were replaced with 40.5% by weight of lower-beating-degree mercerized LBKPs with a CSF value of 705 ml and 4.5% by weight of higher-beating-degree solvent-spun cellulose fibers (highly beaten fibers of "Tencel"; 1.7 dtex×2 mm manufactured by) with a CSF value of 150 ml, such that the alkaline-resistant cellulose fibers as a whole had a CSF value of 660 ml, with a beating degree difference in CSF value between lower-beating-degree cellulose fibers and higher-beating-degree cellulose fibers of 555 ml. The characteristics of this separator are shown in Table 2.

Comparative Example 6

(1) Preparation of a Coarse Layer Slurry

A coarse layer slurry was prepared from 65% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), 13% by weight of lower-beating-degree mercerized LBKPs with a CSF value of 705 ml, and 7% by weight of higher-beating-degree solvent-spun cellulose fibers (highly beaten fibers of "Tencel"; 1.7 dtex×2 mm manufactured by Lenzing) with a CSF value of 150 ml, all dispersed in water. The alkaline-resistant cellulose fibers as a whole had a CSF value of 550 ml, with a beating degree difference in CSF value between lower-beating-degree cellulose fibers and higher-beating-degree cellulose fibers of 555 ml.

(2) An alkaline battery separator was prepared in the same manner as that of Example 1, except that the coarse layer slurry prepared in the above sub-section (1) was used instead. The characteristics of this separator are shown in Table 2.

Comparative Example 7

(1) Preparation of a Coarse Layer Slurry

A coarse layer slurry was prepared from 15% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), 46% by weight of lower-beating-degree mercerized LBKPs with a CSF value of 705 ml, and 23% by weight of higher-beating-degree solvent-spun cellulose fibers (highly beaten fibers of "Tencel"; 1.7 dtex×2 mm manufactured by Lenzing) with a CSF value of 150 ml, all dispersed in water. The alkaline-resistant cellulose fibers as a whole had a CSF value of 550 ml, with a beating degree difference in CSF value between lower-beating-degree cellulose fibers and higher-beating-degree cellulose fibers of 555 ml.

(2) An alkaline battery separator was prepared in the same manner as that of Example 1, except that the coarse layer slurry prepared in the above sub-section (1) was used instead. The characteristics of this separator are shown in Table 2.

Comparative Example 8

An alkaline battery separator was prepared in the same manner as that of Example 1, except that the dense layer contained 35% by weight of polyvinyl alcohol subject fibers (vinylon "VPB033" manufactured by Kuraray Co., Ltd; 0.3 dtex×2 mm), 15% by weight of polyvinyl alcohol binder fibers (vinylon binder "VPB105-1" manufactured by Kuraray Co., Ltd; 1.1 dtex×3 mm), and, as alkaline-resistant cellulose fiber, 50% by weight of beaten fibers of solvent-spun cellulose fibers ("Tencel" manufactured by Lenzing; 1.7 dtex×2 mm) beaten to have a CSF value of 450 ml. The characteristics of this separator are shown in Table 2.

Comparative Example 9

An alkaline battery separator was prepared in the same manner as that of Example 1, except that the alkaline-resistant cellulose fibers used in the coarse layer in Example 1 were replaced with 0% by weight of lower-beating-degree mercerized LBKPs with a CSF value of 705 ml and 45% by weight of higher-beating-degree solvent-spun cellulose fibers (highly beaten fibers of "Tencel"; 1.7 dtex×2 mm manufactured by Lenzing) with a CSF value of 450 ml, such that the alkaline-resistant cellulose fibers as a whole had a CSF value of 450 ml, with a beating degree difference in CSF value between lower-beating-degree cellulose fibers and higher-beating-degree cellulose fibers of 450 ml. The characteristics of this separator are shown in Table 2.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Coarse layer | | | | | | | | | | |
| *Composition (parts by weight)* | | | | | | | | | | |
| PVA fiber 0.3 T × 3 mm | — / 40 | — / 40 | — / 40 | — / 40 | — / 40 | — / 30 | — / 50 | — / 40 | — / 40 | — / 40 |
| Tencel 1.7 T × 3 mm | 150 ml / 15 | 288 ml / 15 | 80 ml / 15 | 150 ml / 7 | 150 ml / 27 | 150 ml / 18 | 150 ml / 12 | 150 ml / 15 | 150 ml / 15 | 150 ml / 15 |
| Mercerized wood pulp | 705 ml / 30 | 705 ml / 30 | 705 ml / 30 | 705 ml / 38 | 705 ml / 18 | 705 ml / 37 | 705 ml / 23 | 705 ml / 30 | 625 ml / 30 | 705 ml / 30 |
| PVA binder fiber | — / 15 | — / 15 | — / 15 | — / 15 | — / 15 | — / 15 | — / 15 | — / 15 | — / 15 | — / 15 |
| Cellulose fiber(s) CSF as a whole (ml) | 550 | 581 | 416 | 598 | 418 | 550 | 550 | 550 | 411 | 550 |
| Difference in beating-degree (high minus low) (ml) | 555 | 417 | 625 | 555 | 555 | 555 | 555 | 555 | 450 | 555 |
| Ratio of higher-beating-degree pulp fiber to cellulose fiber(s) as a whole (%) | 33.3 | 33.3 | 33.3 | 20.0 | 50.0 | 33.3 | 33.3 | 33.3 | 33.3 | 33.3 |
| Content of cellulose fiber(s) (%) | 45 | 45 | 45 | 45 | 45 | 55 | 35 | 45 | 45 | 45 |
| *Physical Properties* | | | | | | | | | | |
| Basis Weight (g/m²) | 13 | 13 | 14 | 13 | 13 | 13 | 13 | 13 | 14 | 13 |
| Thickness (mm) | 0.04 | 0.04 | 0.04 | 0.04 | 0.04 | 0.04 | 0.04 | 0.04 | 0.04 | 0.04 |
| Bulk Density (g/cm³) | 0.32 | 0.32 | 0.33 | 0.32 | 0.32 | 0.31 | 0.30 | 0.32 | 0.31 | 0.32 |
| Dry tensile strength (kg/15 mm) | 0.9 | 0.9 | 0.8 | 0.8 | 1.0 | 0.9 | 1.2 | 0.9 | 1.0 | 0.9 |
| Dry tensile elongation (%) | 6 | 6 | 5 | 5 | 6 | 7 | 5 | 6 | 5 | 6 |
| Liquid (electrolyte) absorption capacity (g/g) | 7.2 | 7.2 | 7.3 | 7.9 | 6.9 | 8.9 | 6.4 | 7.2 | 7.1 | 7.2 |
| Ring crush strength (g) | 80 | 85 | 55 | 62 | 89 | 50 | 93 | 80 | 60 | 80 |
| Average pore size (μm) | 22 | 25 | 19 | 26 | 21 | 21 | 24 | 22 | 21 | 22 |
| Maximum pore size (μm) | 170 | 192 | 102 | 197 | 117 | 180 | 152 | 170 | 115 | 170 |
| Air permeability (cc/cm²/sec) | 86 | 91 | 53 | 99 | 63 | 92 | 92 | 86 | 60 | 88 |
| Dense layer | | | | | | | | | | |
| *Composition (parts by weight)* | | | | | | | | | | |
| PVA fiber 0.3 T × 3 mm | — / 35 | — / 35 | — / 35 | — / 35 | — / 35 | — / 35 | — / 35 | — / 35 | — / 35 | — / 35 |
| Tencel 1.7 T × 3 mm | 232 ml / 50 | 232 ml / 50 | 232 ml / 50 | 232 ml / 50 | 232 ml / 50 | 232 ml / 50 | 232 ml / 50 | 344 ml / 50 | 232 ml / 50 | 125 ml / 50 |
| PVA binder fiber | — / 15 | — / 15 | — / 15 | — / 15 | — / 15 | — / 15 | — / 15 | — / 15 | — / 15 | — / 15 |
| *Physical Properties* | | | | | | | | | | |
| Basis Weight (g/m²) | 14 | 14 | 14 | 14 | 14 | 14 | 14 | 14 | 14 | 13 |
| Thickness (mm) | 0.05 | 0.05 | 0.05 | 0.05 | 0.05 | 0.05 | 0.05 | 0.05 | 0.05 | 0.04 |
| Bulk Density (g/cm³) | 0.29 | 0.29 | 0.29 | 0.29 | 0.29 | 0.29 | 0.29 | 0.29 | 0.29 | 0.30 |
| Dry tensile strength (kg/15 mm) | 1.1 | 1.1 | 1.1 | 1.1 | 1.1 | 1.1 | 1.1 | 1.0 | 1.1 | 1.2 |
| Dry tensile elongation (%) | 6 | 6 | 6 | 6 | 6 | 6 | 6 | 5 | 6 | 5 |
| Liquid (electrolyte) absorption capacity (g/g) | 7.8 | 7.8 | 7.8 | 7.8 | 7.8 | 7.8 | 7.8 | 7.8 | 7.8 | 7.5 |
| Ring crush strength (g) | 65 | 65 | 65 | 65 | 65 | 65 | 65 | 62 | 65 | 48 |
| Average pore size (μm) | 18 | 18 | 18 | 18 | 18 | 18 | 18 | 24 | 18 | 15 |
| Maximum pore size (μm) | 97 | 97 | 97 | 97 | 97 | 97 | 97 | 123 | 97 | 62 |
| Air permeability (cc/cm²/sec) | 34 | 34 | 34 | 34 | 34 | 34 | 34 | 47 | 34 | 28 |
| Bilayer sheet | | | | | | | | | | |
| *Physical Properties* | | | | | | | | | | |
| Basis Weight (g/m²) | 27 | 27 | 28 | 28 | 28 | 28 | 28 | 28 | 28 | 26 |
| Thickness (mm) | 0.09 | 0.09 | 0.09 | 0.09 | 0.09 | 0.09 | 0.09 | 0.09 | 0.09 | 0.08 |
| Bulk Density (g/cm³) | 0.31 | 0.32 | 0.31 | 0.30 | 0.31 | 0.29 | 0.31 | 0.31 | 0.31 | 0.31 |
| Dry tensile strength (kg/15 mm) | 3.0 | 3.1 | 2.7 | 2.8 | 2.2 | 2.7 | 3.2 | 3.0 | 3.1 | 3.1 |
| Dry tensile elongation (%) | 7 | 7 | 7 | 7 | 7 | 7 | 8 | 7 | 8 | 7 |
| Liquid (electrolyte) absorption capacity (g/g) | 6.7 | 6.5 | 6.3 | 6.9 | 6.1 | 6.6 | 6.2 | 6.8 | 6.6 | 6.5 |
| Ring crush strength (g) | 255 Good | 257 Good | 241 Good | 243 Good | 298 Good | 249 Good | 309 Good | 251 Good | 240 Good | 225 Good |
| Average pore size (μm) | 14 | 18 | 15 | 15 | 14 | 17 | 17 | 19 | 15 | 12 |
| Maximum pore size (μm) | 51 Good | 59 Good | 45 Good | 59 Good | 44 Good | 43 Good | 40 Good | 59 Good | 47 Good | 42 Good |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Air permeability (cc/cm$^2$/sec) | 16 | 17 | 14 | 17 | 14 | 18 | 16 | 18 | 14 | 13 |
|  | Good | Good | Good | Good | Good | Good | Good | Good | Good | Good |
| Evaluation | Good | Good | Good | Good | Good | Good | Good | Good | Good | Good |

TABLE 2

|  | Co. Ex. 1 | Co. Ex. 2 | Co. Ex. 3 | Co. Ex. 4 | Co. Ex. 5 | Co. Ex. 6 | Co. Ex. 7 | Co. Ex. 8 | Co. Ex. 9 |
|---|---|---|---|---|---|---|---|---|---|
| Coarse layer | | | | | | | | | |
| Composition (parts by weight) | | | | | | | | | |
| PVA fiber 0.3 T × 3 mm | — | 40 | — | 40 | — | 40 | — | 40 | — | 
| | | | | | | | | | |
| Tencel 1.7 T × 3 mm | — | 0 | 450 15 ml | 150 15 ml | 150 31.5 ml | 150 4.5 ml | 150 7 ml | 150 23 ml | 150 15 ml | 450 45 ml |
| Mercerized wood pulp | 705 ml | 45 | 705 30 ml | 400 30 ml | 705 13.5 ml | 705 40.5 ml | 705 13 ml | 705 46 ml | 705 30 ml | — 0 |
| PVA binder fiber | — | 15 | — | 15 | — | 15 | — | 15 | — | 15 |
| Cellulose fiber(s) CSF as a whole (ml) | 705 | 659 | 322 | 305 | 660 | 550 | 550 | 550 | 450 |
| Difference in beating-degree (high minus low) (ml) | — | 255 | 250 | 555 | 555 | 555 | 555 | 555 | — |
| Ratio of higher-beating-degree pulp fiber to cellulose fiber(s) as a whole (%) | — | 33.3 | 33.3 | 70 | 10 | 33.3 | 33.3 | 33.3 | — |
| Content of cellulose fiber(s) (%) | 45 | 45 | 45 | 45 | 45 | 20 | 70 | 45 | 45 |
| Physical Properties | | | | | | | | | |
| Basis Weight (g/m$^2$) | 14 | 15 | 13 | 13 | 13 | 13 | 13 | 13 | 14 |
| Thickness (mm) | 0.04 | 0.05 | 0.04 | 0.05 | 0.04 | 0.04 | 0.05 | 0.04 | 0.05 |
| Bulk Density (g/cm$^3$) | 0.32 | 0.31 | 0.32 | 0.29 | 0.32 | 0.31 | 0.30 | 0.32 | 0.29 |
| Dry tensile strength (kg/15 mm) | 0.7 | 0.9 | 1.0 | 1.0 | 0.7 | 1.2 | 0.6 | 0.9 | 1.1 |
| Dry tensile elongation (%) | 5 | 5 | 5 | 5 | 5 | 5 | 4 | 6 | 5 |
| Liquid (electrolyte) absorption capacity (g/g) | 8.6 | 7.5 | 7.2 | 7.5 | 8.5 | 6.0 | 9.3 | 7.2 | 8.5 |
| Ring crush strength (g) | 55 | 70 | 75 | 88 | 58 | 98 | 37 Poor | 80 | 70 |
| Average pore size (μm) | 47 | 37 | 18 | 21 | 40 | 32 | 20 | 22 | 33 |
| Maximum pore size (μm) | 283 Poor | 243 Poor | 72 Good | 103 Good | 238 Poor | 219 Poor | 142 Good | 170 Good | 207 Poor |
| Air permeability (cc/cm$^2$/sec) | 138 Good | 89 Good | 36 Poor | 45 Poor | 106 Good | 108 Good | 77 Good | 86 Good | 52 Good |
| Dense layer | | | | | | | | | |
| Composition (parts by weight) | | | | | | | | | |
| PVA fiber 0.3 T × 3 mm | — | 35 | — | 35 | — | 35 | — | 35 | — | 35 |
| Tencel 1.7 T × 3 mm | 232 ml | 50 | 232 ml | 50 | 232 ml | 50 | 232 ml | 50 | 232 ml | 50 | 232 ml | 50 | 232 ml | 50 | 450 ml | 50 | 232 ml | 50 |
| PVA binder fiber | — | 15 | — | 15 | — | 15 | — | 15 | — | 15 | — | 15 | — | 15 | — | 15 | — | 15 |
| Physical Properties | | | | | | | | | |
| Basis Weight (g/m$^2$) | 14 | 14 | 14 | 14 | 14 | 14 | 14 | 14 | 14 |
| Thickness (mm) | 0.05 | 0.05 | 0.05 | 0.05 | 0.05 | 0.05 | 0.05 | 0.05 | 0.05 |
| Bulk Density (g/cm$^3$) | 0.29 | 0.29 | 0.29 | 0.29 | 0.29 | 0.29 | 0.29 | 0.29 | 0.29 |
| Dry tensile strength (kg/15 mm) | 1.1 | 1.1 | 1.1 | 1.1 | 1.1 | 1.1 | 1.1 | 1.0 | 1.1 |
| Dry tensile elongation (%) | 6 | 6 | 6 | 6 | 6 | 6 | 6 | 5 | 6 |
| Liquid (electrolyte) absorption capacity (g/g) | 7.8 | 7.8 | 7.8 | 7.8 | 7.8 | 7.8 | 7.8 | 7.7 | 7.8 |
| Ring crush strength (g) | 65 | 65 | 65 | 65 | 65 | 65 | 65 | 58 | 65 |
| Average pore size (μm) | 18 | 18 | 18 | 18 | 18 | 18 | 18 | 29 | 18 |
| Maximum pore size (μm) | 97 | 97 | 97 | 97 | 97 | 97 | 97 | 211 Poor | 97 |
| Air permeability (cc/cm$^2$/sec) | 34 | 34 | 34 | 34 | 34 | 34 | 34 | 51 Poor | 34 |
| Bilayer sheet | | | | | | | | | |
| Physical Properties | | | | | | | | | |
| Basis Weight (g/m$^2$) | 26 | 27 | 28 | 27 | 27 | 28 | 28 | 28 | 28 |
| Thickness (mm) | 0.09 | 0.09 | 0.09 | 0.09 | 0.09 | 0.09 | 0.08 | 0.09 | 0.10 |
| Bulk Density (g/cm$^3$) | 0.31 | 0.32 | 0.31 | 0.32 | 0.32 | 0.30 | 0.34 | 0.32 | 0.30 |
| Dry tensile strength (kg/15 mm) | 2.7 | 2.1 | 2.8 | 2.6 | 2.8 | 3.2 | 2.2 | 3.1 | 2.6 |
| Dry tensile elongation (%) | 7 | 7 | 8 | 7 | 7 | 8 | 7 | 8 | 6 |
| Liquid (electrolyte) absorption capacity (g/g) | 6.9 | 7.0 | 6.1 | 6.4 | 6.8 | 6.0 | 6.7 | 6.9 | 6.7 |

TABLE 2-continued

|  | Co. Ex. 1 | Co. Ex. 2 | Co. Ex. 3 | Co. Ex. 4 | Co. Ex. 5 | Co. Ex. 6 | Co. Ex. 7 | Co. Ex. 8 | Co. Ex. 9 |
|---|---|---|---|---|---|---|---|---|---|
| Ring crush strength (g) | 278 | 273 | 238 | 280 | 250 | 368 | 183 | 261 | 260 |
|  | Good | Good | Good | Good | Good | Good | Poor | Good | Good |
| Average pore size (μm) | 17 | 18 | 12 | 12 | 16 | 17 | 19 | 25 | 16 |
| Maximum pore size (μm) | 72 | 123 | 42 | 40 | 70 | 78 | 40 | 102 | 80 |
|  | Poor | Poor | Good | Good | Poor | Poor | Good | Poor | Poor |
| Air permeability (cc/cm$^2$/sec) | 18 | 22 | 12 | 12 | 18 | 19 | 15 | 21 | 19 |
|  | Good | Good | Poor | Poor | Good | Good | Good | Good | Good |
| Evaluation | Poor | Poor | Poor | Poor | Poor | Poor | Poor | Poor | Poor |
|  | Short-circuiting | Short-circuiting | Increased Internal resistance | Increased Internal resistance | Short-circuiting | Short-circuiting | Decreased Impact Resistance | Short-circuiting | Short-circuiting |

All of the separators obtained in the Examples 1 to 10 have a reduced maximum pore size, which can minimize the possibility of short-circuiting due to dendrites, while at the same time the separators can have satisfactory liquid (electrolyte) absorption capacity. They also have high ring crush strength under immersion in electrolyte, thus ensuring improved impact resistance when used in a battery. They also have good air permeability, which can achieve a reduced internal resistance of a battery.

A separator obtained in Comparative Example 1 has reduced internal resistance of a battery because of relatively high air permeability. However, its big maximum pore size contributes to short-circuiting due to dendrites. This makes it unsuitable as an alkaline battery separator.

A separator obtained in Comparative Example 2 has reduced internal resistance of a battery because of relatively high air permeability. However, its big maximum pore size contributes to short-circuiting due to dendrites. This makes it unsuitable as an alkaline battery separator.

A separator obtained in Comparative Example 3 has small maximum pore size, which would reduce the possibility of short-circuiting due to dendrites. However, its low air permeability results in increased internal resistance of a battery. This makes it unsuitable as an alkaline battery separator.

A separator obtained in Comparative Example 4 has small maximum pore size, which would reduce the possibility of short-circuiting due to dendrites. However, its low air permeability results in increased internal resistance of a battery. This makes it unsuitable as an alkaline battery separator.

A separator obtained in Comparative Example 5 has reduced internal resistance of a battery because of relatively high air permeability. However, its big maximum pore size contributes to short-circuiting due to dendrites. This makes it unsuitable as an alkaline battery separator.

A separator obtained in Comparative Example 6 has reduced internal resistance of a battery because of relatively high air permeability. However, its big maximum pore size contributes to short-circuiting due to dendrites. This makes it unsuitable as an alkaline battery separator.

A separator obtained in Comparative Example 7 has low ring crush strength, which serves as an indicator of stiffness of the separator when it is immersed in an alkaline electrolyte. Because of this weak strength, the separator is susceptible to displacement inside a battery by impacts such as accidental drops, resulting in short-circuiting. This makes it unsuitable as an alkaline battery separator.

A separator obtained in Comparative Example 8 has reduced internal resistance of a battery because of relatively high air permeability. However, its big maximum pore size contributes to short-circuiting due to dendrites. This makes it unsuitable as an alkaline battery separator.

A separator obtained in Comparative Example 9 has reduced internal resistance of a battery because of relatively high air permeability. Since the difference in bearing degree between cellulose fibers is low, the amount of fine fibers is small, resulting in large maximum pore size. Therefore the separator is susceptible to short-circuiting due to dendrites. This makes it unsuitable as an alkaline battery separator.

Preferred embodiments of the present invention are shown and described. It is to be understood that various changes, modifications and omissions may be made without departing from the spirit of the present invention and are encompassed in the scope of the claims.

What is claimed is:

1. An alkaline battery separator, comprising:
    a coarse layer comprising a first alkaline-resistant synthetic fiber, a first alkaline-resistant binder fiber, and at least two kinds of first alkaline-resistant cellulose fibers having different freeness values from each other; and
    a dense layer comprising a second alkaline-resistant synthetic fiber, a second alkaline-resistant binder fiber, and a second alkaline-resistant cellulose fiber
    wherein the coarse layer comprises the at least two kinds of the first alkaline-resistant cellulose fibers in a proportion of from 25 to 65% by weight of the coarse layer, the at least two kinds of the first alkaline-resistant cellulose fibers, as a whole, have a freeness value of from 350 to 650 ml, a difference in freeness values between one of the at least two kinds of the first alkaline-resistant cellulose fibers having a highest freeness value and one of the at least two kinds of the first alkaline-resistant cellulose fibers having a lowest freeness value is from 300 to 700 ml,
    the dense layer is denser than the coarse layer, the second alkaline-resistant cellulose fiber has, as a whole, a freeness value of from 0 to 400 ml,
    the alkaline battery separator has a maximum pore size of 65 μm or smaller and a liquid absorption capacity of 5 g/g or higher, and
    a difference in freeness values between the whole freeness value of the first alkaline-resistant cellulose fiber and the whole freeness value of the second alkaline-resistant cellulose fiber is from 100 to 450 ml.

2. The alkaline battery separator of claim 1, wherein the at least two kinds of the first alkaline-resistant cellulose fibers comprise the one of the at least two kinds of the first alkaline-resistant cellulose fibers having the lowest freeness value in a proportion of from 15 to 55% by weight.

3. The alkaline battery separator of claim 1, wherein the at least two kinds of the first alkaline-resistant cellulose fibers and the second alkaline-resistant cellulose fiber are optionally different from each other, and each comprises at least one member selected from the group consisting of a mercerized pulp and an organic solvent-spun cellulose fiber.

4. The alkaline battery separator of claim 3, wherein the mercerized pulp comprises at least one member selected from the group consisting of a mercerized hardwood pulp, a mercerized softwood pulp, a mercerized eucalyptus pulp, a mercerized esparto pulp, a mercerized pineapple pulp, a mercerized abaca pulp, a mercerized sisal pulp, and a mercerized cotton linter pulp.

5. The alkaline battery separator of claim 1, wherein each of the first alkaline-resistant synthetic fiber and the second alkaline-resistant synthetic fiber comprises a polyvinyl alcohol fiber.

6. The alkaline battery separator of claim 1, wherein the first alkaline-resistant binder fiber and the second alkaline-resistant binder fiber are optionally different from each other, and each comprises at least one member selected from the group consisting of a polyvinyl alcohol binder fiber and an ethylene-vinyl alcohol copolymer binder fiber.

7. The alkaline battery separator of claim 1, wherein each of the first alkaline-resistant synthetic fiber and the second alkaline-resistant synthetic fiber has a single fiber fineness of from 0.05 to 1 dtex.

8. An alkaline battery, comprising:
an alkaline battery separator of claim 1.

9. The alkaline battery separator of claim 1, wherein the separator has an air permeability of 11 to 40 $cc/cm^2/sec$.

\* \* \* \* \*